Oct. 7, 1969  R. D. VAN VELD  3,471,702

METHOD FOR MEASURING BULK LEVEL OF YARN

Filed Sept. 29, 1967  3 Sheets-Sheet 1

INVENTOR
ROBERT DALE VAN VELD

BY Howard P. West Jr
ATTORNEY

Oct. 7, 1969   R. D. VAN VELD   3,471,702
METHOD FOR MEASURING BULK LEVEL OF YARN
Filed Sept. 29, 1967   3 Sheets-Sheet 3

INVENTOR
ROBERT DALE VAN VELD

BY Howard P. West Jr.
ATTORNEY

United States Patent Office 3,471,702
Patented Oct. 7, 1969

3,471,702
METHOD FOR MEASURING BULK LEVEL OF YARN
Robert Dale Van Veld, Greenville, N.C., assignor to E. I. du Pont de Nemours and Company, Wilmington, Del., a corporation of Delaware
Filed Sept. 29, 1967, Ser. No. 671,878
Int. Cl. G01n 21/30
U.S. Cl. 250—219        2 Claims

ABSTRACT OF THE DISCLOSURE

A method for measuring the bulk level of a moving yarn that includes passing the yarn under constant tension or elongation through a focused beam of light then relating the yarn bulk to the ratio of diffuse to specular light reflectance from the moving yarn.

BACKGROUND OF THE INVENTION

This invention relates generally to the production of filamentary structures and, more particularly, to the determination of the specific volume or bulk level of yarns that have been processed in a way to enhance the openness between individual filaments such as by crimping, looping, or otherwise disturbing the parallel structure of the filaments and consequently increasing the bulk.

In the past it has been customary to measure yarn bulk by determining a factor called crimp elongation. This was done by measuring the length of a yarn sample first under a very low tension, and then under a higher tension selected by experience to be large enough to straighten out substantially the bulked filaments but insufficient to extend the filaments once they have been straightened. This method has been satisfactory for laboratory determinations of bulk level on small numbers of samples, but would be time consuming and difficult to automate and apply to many samples or to a continuous running yarn line.

SUMMARY OF THE INVENTION

It has been found that light reflectance measurements on a bulk yarn before boil-off, particularly measurements of the ratio between the diffusely reflected and the specularly reflected light taken as the yarn is moved at a constant elongation past a light source, provide information that correlates extremely well with the finished bulk of the yarn. This invention has been made to take advantage of this finding.

The primary objective of this invention is to provide a method for measuring yarn bulk continuously and automatically on a running yarn line without destructive contact therewith.

This objective is achieved by a method that includes passing a continuous length of yarn under minimum vibration and constant elongation through an inspection zone and focusing a spot of light on the yarn. Then gathering specularly reflected light from this spot and impressing it on a first photo cell and gathering diffusely reflected light from the same spot and impressing it on a second photo cell. Electronic means are provided for amplifying the electrical signals from each photo cell, simultaneously and separately averaging the signals over a specified time period and for determining the ratio of the averaged diffused to specular signals. The output of this ratio determining circuitry is fed to a recording potentiometer. A reference signal is also provided to this potentiometer. Thus, the ratio of the averaged photo cell signals and the difference between this ratio and the reference sginal are recorded.

DETAILED DESCRIPTION OF THE PREFERRED EMBODIMENT

Figure 1:
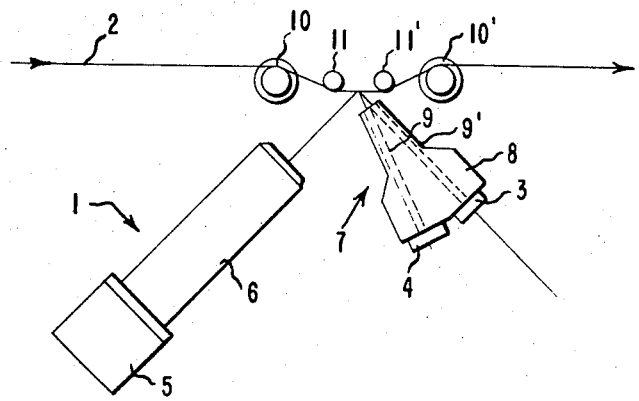
FIGURE 1 is a schematic drawing of the optics including the two photo cells.

In FIG. 1, a conventional light source 1 is arranged to focus a spot of light on a running yarn line 2 which is constrained to move without vibration in a straight line as described in connection with FIG. 2 below. Source 1 comprises a housing 5 containing a light bulb such as an automotive head lamp and a lens support 6 containing a conventional condensing lens which concentrates and focuses the light on the yarn line. Angularly displaced from source 1 approximately 90° is the detecting head 7 comprising a mount 8 accommodating two photo cell detectors 3, 4. Two bores 9, 9' are provided through mount 8 such that one bore 9' is inclined with respect to yarn line 2 and source 1 at the angle of specular reflection and the other bore 9 is inclined at an angle typically 17½° off-specular in a clockwise direction, that is, toward source 1 from bore 9'. Detecting head 7 and source 1 are mounted on plate 29 (FIG. 2) by means of adjustable fasteners, not shown, so that the relative orientation of source 1 and head 7 may be adjusted. Two V-grooved wheels 10, 10' are rotatably mounted on plate 29. In addition, two cooperating ceramic guide pins 11, 11' are mounted between wheels 10, 10' in such a way that yarn is passed between the two wheels and over the two pins to provide a straight path for the yarn line and minimize yarn vibration within the inspection zone at the intersection between the axes of source 1 and head 7.

Figure 2:
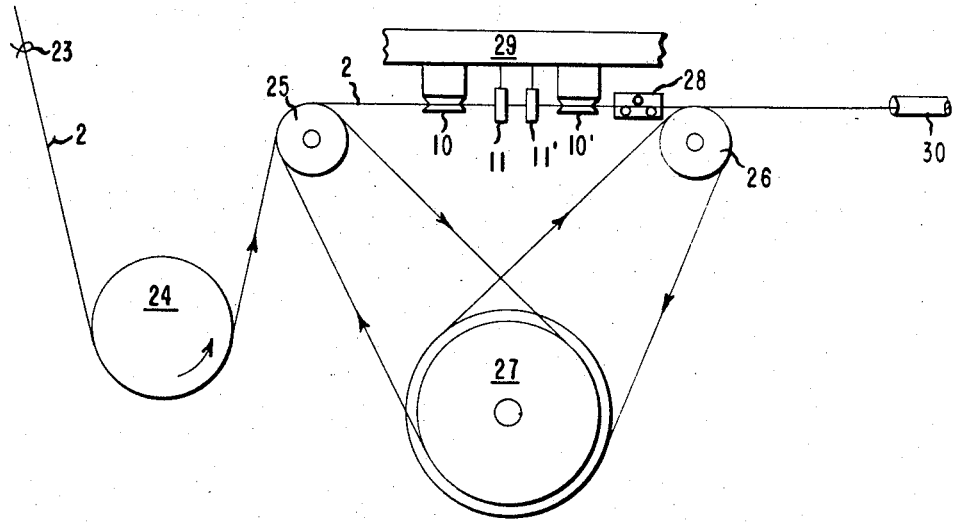
FIG. 2 is a schematic drawing of the mechanical means for continuously driving a yarn line at a constant elongation level through an inspection zone.

Movement and control of elongation of the yarn line is accomplished by the mechanical means shown in FIG. 2. Yarn from a conventional supply package (not shown) such as a pirn, bobbin or the like, is unwound and passed through a pigtail guide 23 and thence to tensioning means 24 such as a magnetic drag tensiometer. The yarn then is passed around a freely rotatable "separator" roll 25 and thence to a driven step roll 27 and back to roll 25. Conventional motor means, not shown, is provided to drive roll 27. Several turns of yarn are taken about rolls 25 and 27 to provide good frictional contact therewith, these turns being made about the smaller diameter inner surface of the step roll 27. Slight canting of roll 25 relative to the axis of roll 27 causes the yarn turns wrapped thereabout to be splayed laterally thus separating one from the other and allowing each turn to make contact with the rolls. Next the yarn leaves roll 25 and passes over guide wheel 10, pins 11, 11', guide wheel 10' and thence thorugh a conventional tensioning means 28 to a freely rotating canted separator roll 26. Now, several turns are taken around roll 26 and the larger diameter section of roll 27. Finally, the yarn is taken tangentially off roll 26 to a sucker gun withdrawing means 30.

Figure 2A:
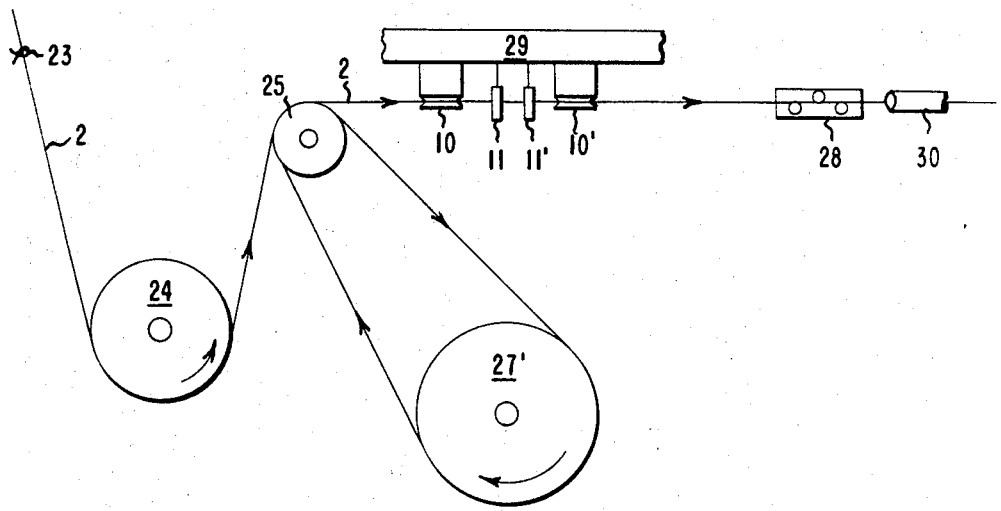
FIG. 2A is a schematic drawing showing a modification of FIG. 2 for providing constant yarn tension.

The use of step roll 27 provides an increase in speed of yarn between rolls 25 and 26 thus providing a constant yarn elongation at the inspection point. An alternate embodiment is shown in FIG. 2A which provides for measurements at essentially constant tension rather than constant elongation. In this embodiment roll 27' is a single roll instead of a step roll. Roll 26 of FIG. 2 is eliminated and sucker gun 30 is relied on to provide essentially constant tension.

Figure 3:
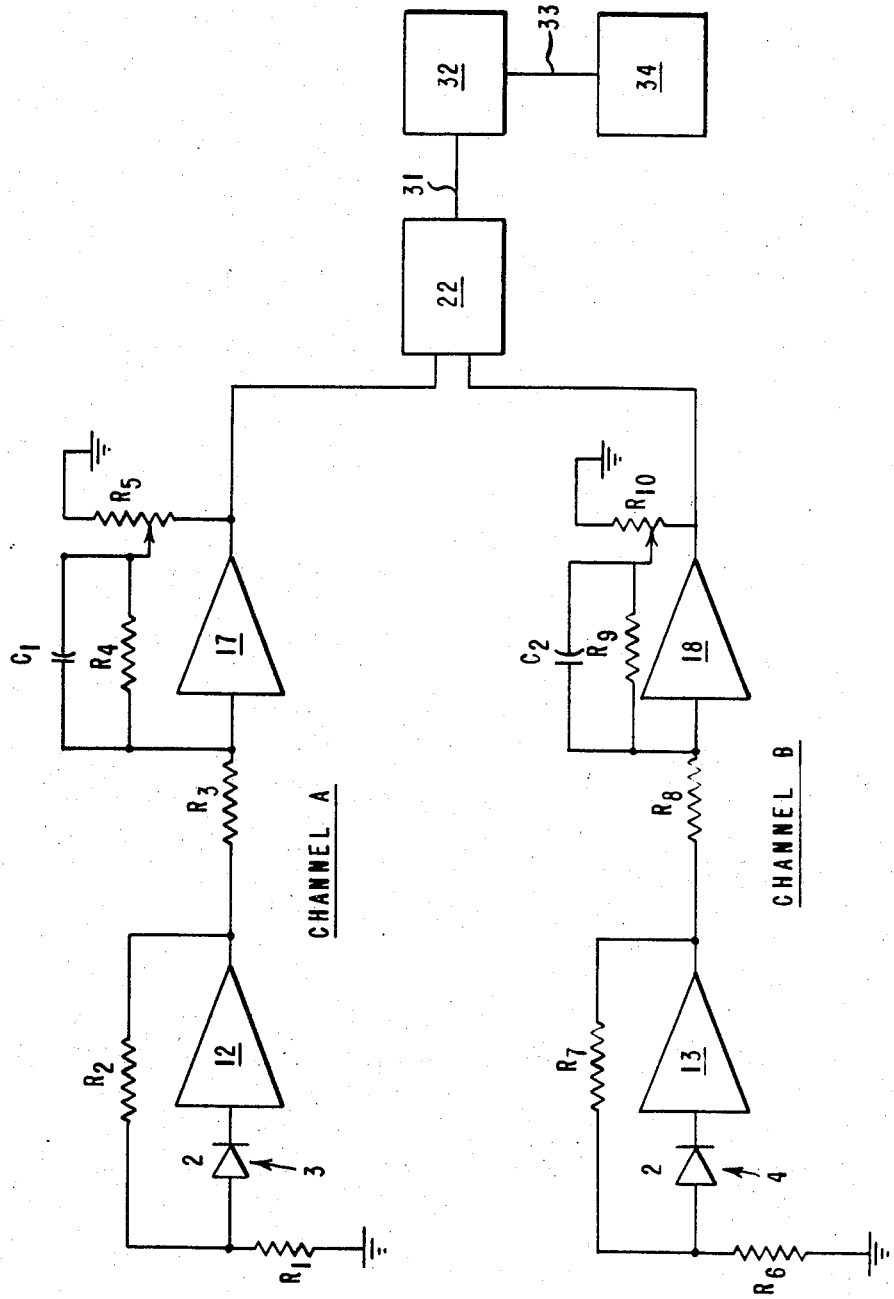
FIG. 3 is a schematic circuit diagram of the amplifying, averaging and ratio measuring means along with the associated recorder and reference device.

Turning now to FIG. 3, the electronic circuitry of this invention will be described. Amplification and time-averaging of the separate outputs of photo cells 3 and 4 (receiving specular and diffuse illumination respectively) is provided by separate channels A and B. Since both channels are identical in all respects, only channel A will be described.

One terminal of photo cell 3 is connected through resistor $R_1$ to ground. The other terminal of cell 3 is connected to the summing junction input of a high gain chopper-stabilized amplifier 12 (typically a Philbrick Model SP65A). Feedback resistor $R_2$ is connected between the output terminal of amplifier 12 and the first described terminal of photo cell 3. Resistors $R_1$ and $R_2$ typically have values of 100 ohms and 40K ohms respectively. Output of amplifier 12 is fed through resistor $R_3$ to the input terminal of a second amplifier 17 (typically a Philbrick Model P65AU). Time-averaging of the signal is provided by virtue of the RC time constant of the parallel feedback circuit for amplifier 17 comprising capacitor $C_1$ in parallel with resistor $R_4$ connected between the input and output terminals of amplifier 17 with potentiometer $R_5$ connected between one side of this feedback circuit and the output terminal of amplifier 17 in such a way that the total resistance of potentiometer $R_5$ is connected between the output terminal of amplifier 17 and ground and the movable contact of potentiometer $R_5$ connects to one side of this parallel feedback circuit. Typical values of capacitor $C_1$, resistor $R_4$, and potentiometer $R_5$ are 10 microfarads, 200K ohms, and 10K ohms respectively. Potentiometer $R_5$ produces an inverse proportional change in gain for the channel.

The output signals from channels A and B are connected to a solid state "divider" circuit 22 to obtain the ratio of B to A. Circuit 22 is typically a Philbrick Model $Q_3$–MIP. Output from circuit 22 is fed over cable 31 to a conventional strip chart recorder 32. A reference signal from a separate power supply 34 is fed over cable 33 also to recorder 32. A first power supply is employed to feed the first amplifier stages of each channel and a second-separate power supply is employed to energize the remaining electronic circuitry.

In operation the light source 1 and the electronic circuitry are energized and, after initial alignment of the optics, a yarn is continuously run through the yarn feed mechanism as shown in FIGS. 2 or 2A. Readings on recorder 32 are calibrated and/or amplifier gains adjusted by reference to bulk values for samples taken from the yarn so characterized and measured by means of the previously described crimp elongation test.

Thus, this invention provides continuous measurements of yarn bulk automatically and without necessity of destructive contacts with the yarn. Since the electronic components lend themselves to use of solid state devices, the device of this invention is rugged and requires minimum maintenance.

Figure 4:
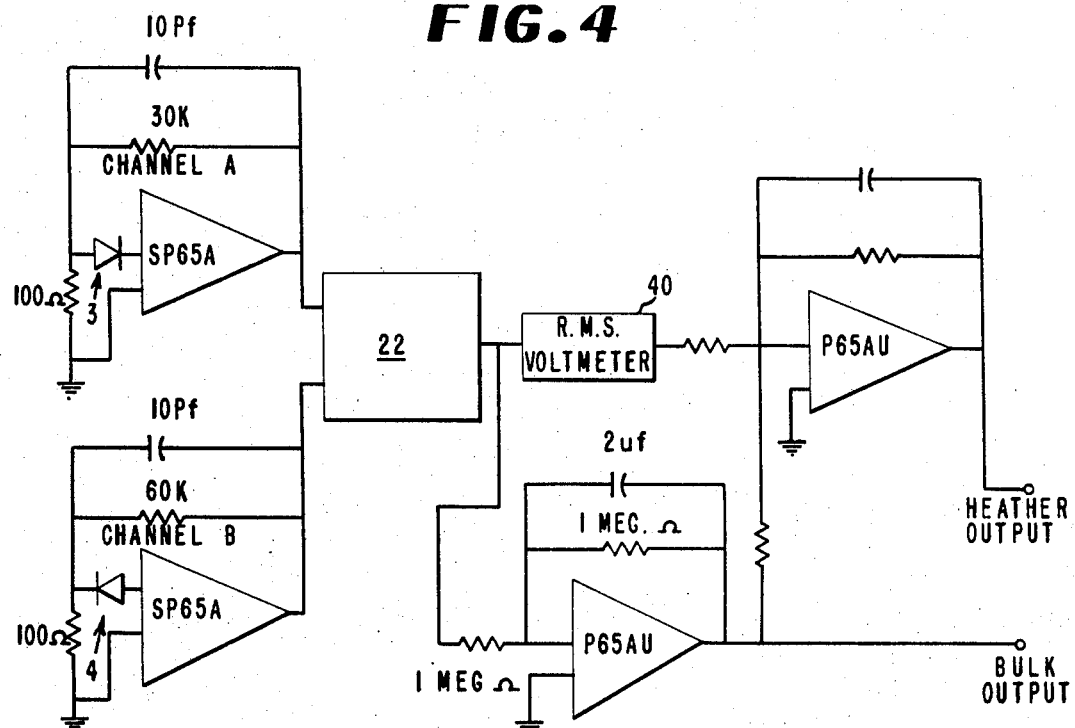
FIG. 4 is a schematic circuit diagram employed to obtain heather index measurements.

One valuable modification to this invention provides for the characterization of yarn to determine the propensity for the appearance of heather in a fabric made from the yarn tested. This modification includes the addition of an RMS voltmeter 40 in a circuit branched from the output of divider circuit 22 as shown in FIG. 4. Voltmeter 40 is employed to obtain a signal proportional to the variance of the ratio signal output from divider 22. By adding this variance signal, averaged over a specified time and multiplied by a first derived constant, to the ratio signal, averaged over the same time interval and multiplied by a second derived constant, a signal is obtained which correlates with the intensity of heather formed in a fabric made from the yarn tested. In other words, $$\text{heather} = A_0 + A_1 \overline{R} + A_2 \overline{V}$$

where $\overline{R}$ is the average ratio and $\overline{V}$ is the variance found over a specified time and $A_0$, $A_1$, $A_2$ are derived constants.

It is obvious that other modifications and changes may be made by one skilled in the art without departing from the spirit of the present invention.

What is claimed is:
1. A continuous method for automatically measuring the bulk level of a moving yarn comprising:
   (a) focusing a beam of light obliquely on the yarn;
   (b) constraining the yarn to move without vibration in a straight line past the focal point of said light beam;
   (c) elongating the yarn a constant amount as it moves past the focal point;
   (d) simultaneously measuring the intensity of the specular and diffused reflections from the yarn of said focused beam by means of respective photocells adapted to emit equivalent electrical signals;
   (e) simultaneously and separately time-averaging said equivalent electrical signals from the specular and diffused reflected light;
   (f) determining the ratio of the averaged diffused to specular signals; and
   (g) comparing the ratio to a standard signal.
2. The method of claim 1 wherein said diffused reflections are measured at an angle of 17½° from the plane of the specular reflections.

References Cited

UNITED STATES PATENTS

| 2,991,685 | 7/1961 | Van Dongeren. |
| 3,305,688 | 2/1967 | Lamparter _____ 19—239 X |

OTHER REFERENCES

Hunter and Lofland, A Gloss Test for Waxed Paper, Technical Association of the Pulp and Paper Industry, vol. 39, No. 12, December 1956, pp. 833–41.

Ward and Benerito, Correlation of Visual Luster With Measured Reflection of Cotton Fabrics, Textile Research Journal, vol. 35, No. 3, March 1965, pp. 271–79.

RALPH G. NILSON, Primary Examiner

C. M. LEEDOM, Assistant Examiner

U.S. Cl. X.R.

19—239; 28—64; 56—199; 73—160